US012689130B2

(12) United States Patent
Ren et al.

(10) Patent No.: US 12,689,130 B2
(45) Date of Patent: Jul. 21, 2026

(54) FREQUENCY BEAM-STEERED SUBSTRATE-INTEGRATED ANTENNAS

(71) Applicant: NXP B.V., Eindhoven (NL)

(72) Inventors: Dongyin Ren, Santa Clara, CA (US); Ryan Haoyun Wu, San Jose, CA (US); Baokun Liu, Kokomo, IN (US)

(73) Assignee: NXP B.V., Eindhoven (NL)

( * ) Notice: Subject to any disclaimer, the term of this patent is extended or adjusted under 35 U.S.C. 154(b) by 63 days.

(21) Appl. No.: 18/602,502

(22) Filed: Mar. 12, 2024

(65) Prior Publication Data

US 2025/0293435 A1 Sep. 18, 2025

(51) Int. Cl.
*H01Q 13/20* (2006.01)
*H01Q 13/26* (2006.01)

(52) U.S. Cl.
CPC ........... *H01Q 13/206* (2013.01); *H01Q 13/26* (2013.01)

(58) Field of Classification Search
CPC ............................ H01Q 13/206; H01Q 13/26
See application file for complete search history.

(56) References Cited

U.S. PATENT DOCUMENTS 4,821,044 A * 4/1989 Kurtz .................. H01Q 21/005 343/771
8,665,142 B2 * 3/2014 Shijo ........................ G01S 7/03 342/175
11,300,656 B2 4/2022 Chandrasekaran et al.
11,681,015 B2 * 6/2023 Foroozesh ............ G01S 7/2813 342/379
2005/0140556 A1 * 6/2005 Ohno ..................... H01Q 21/08 343/770

(Continued)

FOREIGN PATENT DOCUMENTS

CN 111463578 A * 7/2020 ........... H01Q 13/206
CN 113013614 A 6/2021

OTHER PUBLICATIONS

Guan, Dong-Fang et al; "Scanning Rate Enhancement of Leaky-Wave Antennas Using Slow-Wave Substrate Integrated Waveguide Structure"; IEEE Transactions on Antennas and Propagation, vol. 66, No. 7; pp. 3747-3751; (Jul. 2018).

(Continued)

*Primary Examiner* — Dameon E Levi
*Assistant Examiner* — Jordan E. DeWitt

(57) ABSTRACT

A frequency beam-steered leaky wave antenna suitable for integration in a substrate such as a printed circuit board includes a waveguide formed from a first electrically-conductive surface and a second electrically conductive surfaces forming upper and lower surfaces of the waveguide and electrically-conductive vias form first and second sidewalls disposed between the upper and lower surfaces along a length of the waveguide. The waveguide has slotted openings distributed along the upper surface and a width of the waveguide is defined by a distance between the two sidewalls that varies along the length of the waveguide. A portion of radiofrequency energy travelling along a length of the waveguide is radiated away from the waveguide through the slotted openings. Performance characteristics of the antenna such as its directivity and operational bandwidth can be tuned by adjusting the geometry of the slotted openings and positioning of the vias.

18 Claims, 6 Drawing Sheets

(56) References Cited

U.S. PATENT DOCUMENTS

| | | | | |
|---|---|---|---|---|
| 2008/0074338 | A1* | 3/2008 | Vacanti | H01Q 21/28 343/705 |
| 2009/0066597 | A1* | 3/2009 | Yang | H01P 3/121 343/771 |
| 2015/0222023 | A1* | 8/2015 | Shijo | G01S 13/4463 342/195 |
| 2016/0126637 | A1* | 5/2016 | Uemichi | H01Q 21/0043 343/771 |
| 2016/0359215 | A1* | 12/2016 | Yatabe | H01P 1/201 |
| 2020/0227808 | A1* | 7/2020 | Salem | H01Q 25/02 |
| 2021/0218146 | A1* | 7/2021 | Hashimoto | H01Q 1/38 |
| 2023/0280446 | A1 | 9/2023 | Ren et al. | |

OTHER PUBLICATIONS

Poveda-García, Miguel et al; "Frequency-Beam-Scanning mm-Wave Antennas for Direction Finding Radar"; Proceedings 19th European Radar Conference (EuRAD), Milan, Italy; pp. 293-296; (Sep. 2022).

Sarkar, Anirban et al; "60 GHz Compact Larger Beam scanning Range PCB Leaky-Wave Antenna Using HMSIW for Millimeter-Wave Applications"; IEEE Transactions on Antennas and Propagation, vol. 68, No. 8; 11pages (Aug. 2020).

Farooq, Memoona et al; "A SIW Based Leaky-Wave Antenna for 5 GHz Narrowbeam Applications"; IEEE Int'l Symp on Antennas and Propagation & USNC/URSI National Radio Science Meeting; pages (Jul. 9, 2017).

Liu, Juhua et al; "Investigations of SIW Leaky-Wave Antenna for Endfire-Radiation With Narrow Beam and Sidelobe Suppression"; IEEE Trans. on Antennas and Propagation, vol. 62, No. 9, USA; pages (Sep. 1, 2014).

Liu, Juhua et al; "Substrate Integrated Waveguide (SIW) Leaky-Wae Antenna With Transverse Slots"; IEEE Trans. on Antennas and Propagation, vol. 60, No. 1; pages (Jan. 2012).

Mohtashami, Yahya et al: "A Butterfly Substrate Integrated Waveguide Leaky-Wave Antenna"; IEEE Trans. on Antennas and Propagation, vol. 62, No. 6; pages (Jun. 2014).

* cited by examiner

FREQUENCY BEAM-STEERED SUBSTRATE-INTEGRATED ANTENNAS

TECHNICAL FIELD

Embodiments of the disclosure are related to waveguide-based radio-frequency and microwave (RFMW) antennas formed within a substrate such as a printed circuit board.

BACKGROUND

Passenger automobiles that employ advanced driver assistance systems (ADAS) and other safety and navigation systems increasingly use radar-based sensing to determine the location of nearby objects such as other vehicles, pedestrians, and road obstructions. In order to achieve angularly-resolved information, antenna arrays are often used, including electrically-steerable antennas such as a phased arrays and other steerable antennas.

BRIEF SUMMARY

In an example embodiment, a device includes a circuit substrate and a leaky wave antenna formed within the circuit substrate. The antenna includes a hollow or dielectric-filled electrically-conductive waveguide having a length along a first direction that defines a propagation direction for radio-frequency (RF) signals within the waveguide. The waveguide is formed by a first electrically-conductive surface that defines an upper surface of the waveguide with slotted openings distributed on the upper surface along the length of the waveguide that are configured to radiate a portion of the RF signals that travel along the propagation direction within the waveguide away from the waveguide; a second electrically-conductive surface parallel to the upper surface that defines a lower surface of the waveguide; and electrically-conductive vias that pass through the circuit substrate between the upper surface and the lower surface of the waveguide that define a first sidewall of the waveguide and a second sidewall of the waveguide that is opposite the first sidewall of the waveguide. A width of the waveguide varies along the length of the waveguide and is defined by a variable distance between the first and second sidewalls along a second direction that is perpendicular to the first direction.

In another example embodiment a method includes forming electrically-conductive vias that pass through a circuit substrate between a first electrically-conductive surface of the circuit substrate and a second electrically-conductive surface of the substrate. The first electrically-conductive surface defines an upper surface of an electrically-conductive hollow or dielectric-filled waveguide. The second electrically-conductive surface is parallel to the first electrically-conductive surface and defines a lower surface of the waveguide. The electrically-conductive vias define a first sidewall of the waveguide and a second sidewall of the waveguide that is opposite the first sidewall of the waveguide. The electrically-conductive vias are configured and dimensioned to reflect incident RF signals having frequencies within a predetermined operational frequency range of the antenna such that the incident RF signals coupled to a first end of the waveguide are guided along a propagation direction of the waveguide toward a second end of the waveguide. A width of the waveguide varies along the length of the waveguide and is defined by a variable distance between the first and second sidewalls along a second direction that is perpendicular to the propagation direction of the waveguide. The method also includes forming slotted openings distributed on the upper surface along the length of the waveguide that are configured to radiate a portion of the RF signals that travel along the propagation direction within the waveguide away from the waveguide.

BRIEF DESCRIPTION OF THE SEVERAL VIEWS OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein.

DETAILED DESCRIPTION

Figure 1A:
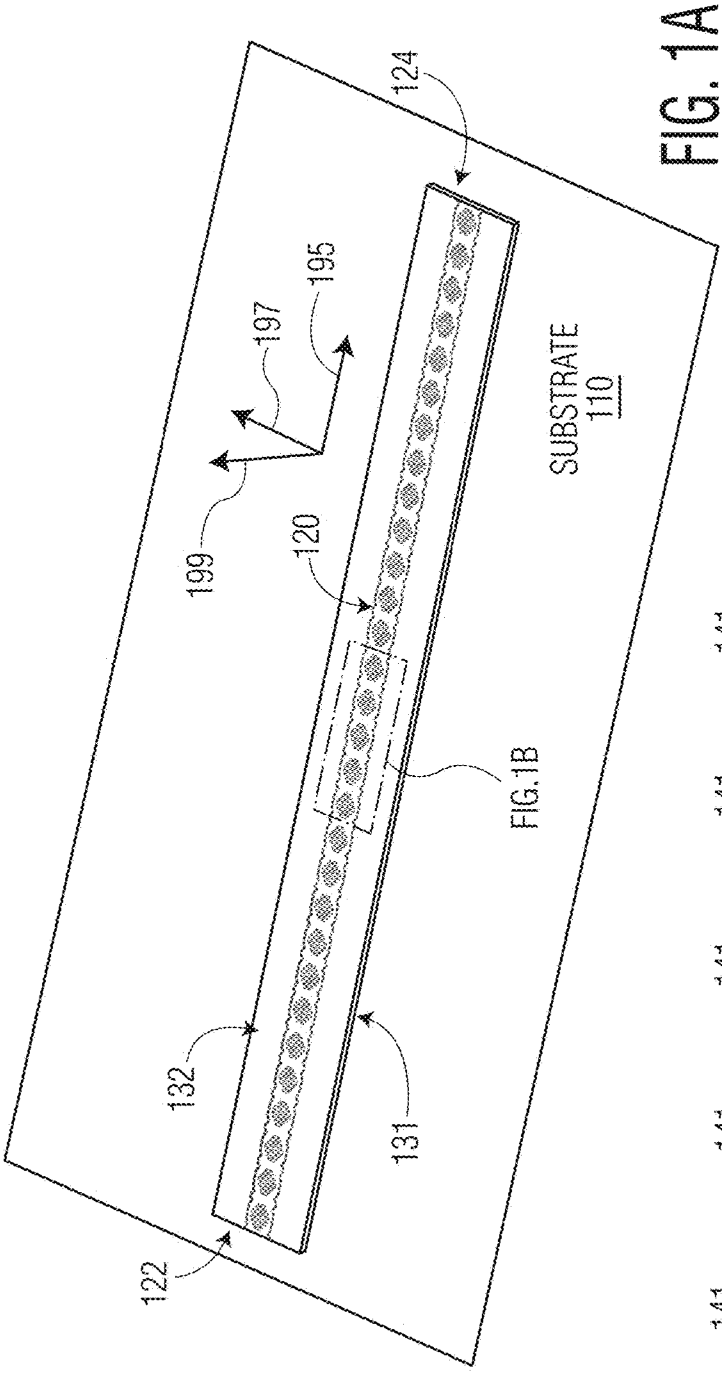
FIG. 1A is a schematic perspective view of a leaky wave antenna according to one or more embodiments formed using a substrate-integrated waveguide.

The following detailed description provides examples for the purposes of understanding and is not intended to limit the invention or the application and uses of the same. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements or regions in the figures may be exaggerated relative to other elements or regions to help improve understanding of embodiments of the invention. Directional references such as "top," "bottom," "left," "right," "above," "below," and so forth, unless otherwise stated, are not intended to require any preferred orientation, and are made with reference to the orientation of the corresponding figure or figures for purposes of illustration.

As radar sensing systems have become common for commercial applications such as passenger vehicles including advanced driver assistance systems (ADAS) and other safety and navigation, there has been increasing demand for miniaturization, cost reduction, and energy conservation in radar components. Existing solutions providing for spatially resolved beams using phased arrays and other approaches may not be suitably space-effective and/or cost-effective for some applications. Accordingly, compact electronically steerable antennas for millimeter-wave radars are desirable.

One approach to frequency-based beam steering in directional antennas makes use of a so-called "leaky wave" antenna. One type of leaky wave antenna is formed by introducing openings in a conventional hollow or dielectric-filled conductive waveguide. The openings allow a portion of radio-frequency signals travelling through the waveguide to "leak" through the openings (i.e., to radiate away from the waveguide). When many openings are present in the waveguide, the radiated signals can constructively and destructively interfere at various locations surrounding the waveguide. When the openings are suitably arranged, directional radiation patterns can be realized and the angular orientation of those patterns will depend upon the frequency or frequencies of radio-frequency (RF) signals coupled to transverse propagation modes of the waveguide. Although previous leaky wave antennas based on waveguides can allow beam-steering by adjusting the frequency of RF signals coupled to the waveguides, it can be difficult to obtain suitable impedance matching to typical transmitter devices and other structures and the impedance can vary significantly with frequency, limiting the operational bandwidth of such antennas Along these lines, FIG. 1A shows a schematic perspective view of a portion of an electronic device provided with an example leaky wave antenna according to one or more embodiments that enables frequency-based beam steering that can exhibit improved performance characteristics (e.g., wider operation bandwidth, lower return losses, etc.) compared to previous approaches. Because antennas according to embodiments herein are formed from modified waveguide structures, they may be referred to variously as waveguides or waveguide antennas. The waveguide antenna of FIG. 1A, (referred to as the waveguide 120) is a leaky wave antenna formed on or within a substrate 110 that is related to known hollow and dielectric-filled waveguides with electrically-conductive walls. The waveguide 120 is defined by a lower surface 131, an upper surface 132, and vertical sidewalls that extend between the lower surface 131 and the upper surface 132. Each of these surfaces and sidewalls are sufficiently electrically conductive to guide incident radio-frequency (RF) signals that are coupled to the waveguide 120 at the first end 122 to propagate along the propagation direction 195 toward the second end 124 (or vice versa for RF signals that are coupled to the waveguide at the second end 124) for signals that have frequencies within an operational bandwidth of the waveguide 120 determined by the cross-section of the waveguide 120. In the following descriptions, the "length" of the waveguide 120 is defined by its extent along the propagation direction 195, while the width of the waveguide 120 is defined by its extent along the direction 197, which is parallel to the upper surface 132 and lower surface 131. Meanwhile, the "height" of the waveguide is defined by its extent in the perpendicular direction 199.

Figure 1B:
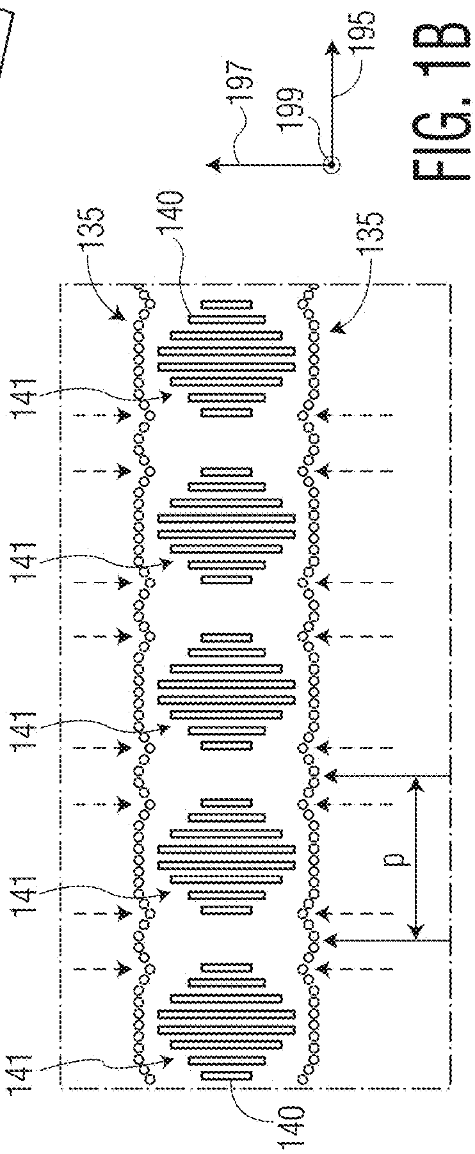
FIG. 1B is an expanded plan view of a portion of the substrate-integrated waveguide of FIG. 1A.

As shown, the upper surface 132 of the waveguide 120 includes numerous slotted openings 140 ("slots" which can be seen in greater detail in FIG. 1B). The slotted openings 140 are areas where the electrically conductive material of the upper surface 132 is absent or sufficiently thinned to allow RF energy propagating within the waveguide 120 to "leak out" (i.e., to radiate away from the waveguide into the surrounding environment). Accordingly, the waveguide 120 and related structures can be referred to as a leaky wave antenna. It will be appreciated signals radiated away from the waveguide 120 via the slotted openings 140 can interfere constructively or destructively with each other at different points in space surrounding the waveguide 120. It will be further appreciated that parameters such as the number of slotted openings 140, their dimensions, and their relative positions along the propagation direction 195 determine, at least in part, where constructive and destructive interference will occur.

Unlike previous waveguide-based leak wave antennas, leaky wave antennas according to one or more embodiments such as the waveguide 120 have an effective width (measured along the in-pane direction 197 which is parallel to the upper surface 132 and perpendicular to the length of the waveguide 120 along the propagation direction 195) that varies along the propagation direction 197. This arrangement can be understood from FIG. 1B which shows an expanded top plan view of a portion of the waveguide 120. In one or more embodiments openings in a waveguide such as the slotted openings 140 in the waveguide 120 are arranged into groups such as the groups 141 of the slotted openings 140. In the example of FIGS. 1A and 1B, the variable width of the waveguide 120 is achieved by varying the placement of electrically-conductive vias 135 in the substrate 110 (e.g., a printed circuit board substrate). In one or more embodiments, as shown, vias such as the electrically-conductive vias 135 form side walls of a waveguide with corrugations or "indentations" (areas where some of the vias are displaced "inward" toward the interior of the waveguide relative to vias in nearby locations along the length of the waveguide 120 corresponding to the propagation direction 195). It will be appreciated that discrete conductive structures such as the electrically-conductive vias 135 can behave collectively as a continuous reflective structure such as a sidewall of the waveguide 120 for RF signals having wavelengths that are larger than the spacing between the vias.

In one or more embodiments, as shown in FIG. 1B, vias such as the electrically-conductive vias 135 are displaced to form indentations that occur periodically along the length of the waveguide (indicated by a period, p). In one or more such embodiments, as shown in FIG. 1B, vias corresponding to indentations are located at positions that correspond to edges groups of slotted openings such as the group 141 of the slotted openings 140. In one or more embodiments, as shown in FIG. 1B, the width (i.e., along the in-pane direction 197) of slotted openings such as the slotted openings 140 varies in an ordered fashion within each group. For example, as shown in FIG. 1B the width of the slots in a group is greatest at the center of that group and decreases toward the edge of that group. Such a configuration will be referred to herein as "tapering" of a group of slotted openings in a waveguide.

It will be understood that nothing herein is intended to require that the sidewalls of a waveguide such as the waveguide 120 or corrugations in those sidewalls are formed by vias such as the electrically-conductive vias 135. However, it will be appreciated that forming waveguides with corrugated sidewalls using vias such as the electrically-conductive vias 135 can be advantageous in certain applications. For instance, it may be difficult to form a continuous corrugated sidewall using conventional printed circuit board fabrication techniques with a sufficient degree of dimensional uniformity. In addition, it will be appreciated that the use of individual vias such as the electrically-conductive vias 135 can require less metal than would be required for continuous sidewalls. If the vias are sized and spaced appropriately with respect to the desired operating frequencies of the waveguide, such "via fences" can perform comparably to solid metal sidewalls.

It will be understood that lower surface 131 and the upper surface 132 can be formed from any suitably conductive materials and dimensioned in any manner suitable to confine and guide RF signals along the propagation direction 195. Along these lines it will be understood that although the lower surface 131 and upper surface 132 may be depicted as extending beyond the sidewalls formed by the electrically-conductive vias 135 that this is not required. However, such an arrangement can be convenient; for example, the lower surface 131, the upper surface 132, or both surfaces can be formed from metal layers usable as ground planes in printed circuit boards or other electrically-conductive surfaces.

An arrangement of slotted openings such as the slotted openings 140 and discrete vias such as the electrically-conductive vias 135 can be treated as composite of left-handed and right-handed metamaterials which behave as a single antenna. Such structures are sometimes referred to as composite right-handed left-handed ("CRLH") metamaterials. As such, the waveguide 120 can be modeled as a circuit that has lumped elements that correspond to left-handed transmission line structures and other lumped elements that correspond to right-handed transmission line structures.

Figure 1C:
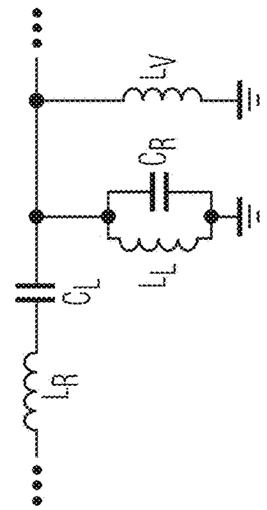
FIG. 1C is a circuit diagram illustrating a lumped circuit model of a unit cell of the substrate-integrated waveguide of FIG. 1A and FIG. 1B.

Along these lines, FIG. 1C is a two-port lumped circuit model of the waveguide 120. Like other rectangular conductive waveguides, the waveguide 120 can be modeled as a combination of an inductance and capacitance in series ($L_R$ and $C_L$) coupled to a parallel inductance and capacitance ($L_L$ and $C_R$). The additional inductance $L_V$ is used to account for the variable effective width of the waveguide 120. As will be described in greater detail below, this additional degree of freedom can allow improved RF impedance matching when compared with previous approaches.

Figure 2A:
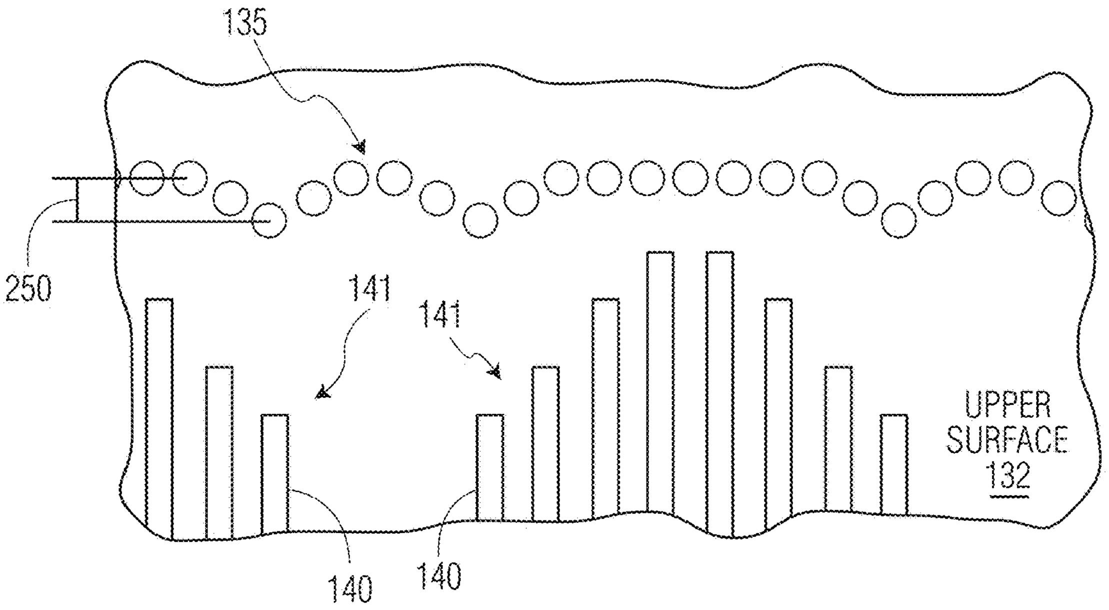
FIG. 2A is an expanded plan view showing elements of the leaky wave antenna of FIG. 1A and FIG. 1B in greater detail.

FIG. 2A is a plan view of the upper surface 132 of the waveguide 120 that shows the corrugated sidewalls of the waveguide 120 in greater detail. As shown, some of the electrically-conductive vias 135 are positioned at a first distance from the center of the waveguide 120, while some of the electrically-conductive vias 135 are displaced by up to a distance 295 from the other electrically-conductive vias 135 to form corrugations in the sidewalls of the waveguide 120. In this example, the width of the sidewalls follows the width variations in the slotted openings 140, and the maximum displacement 295 in the electrically-conductive vias 135 occurs just beyond the outermost slotted openings 140 in each group 141 of the slotted openings 140. The shape of the sidewalls, including the amount of corrugation (i.e., the magnitude and direction of the displacement 295) can be varied to achieve desired performance characteristics. In particular, a corrugated sidewall pattern can be used to tune the desired operational bandwidth, the center frequency of the operational bandwidth, and impedance of a waveguide antenna such as the waveguide 120.

Figure 2B:
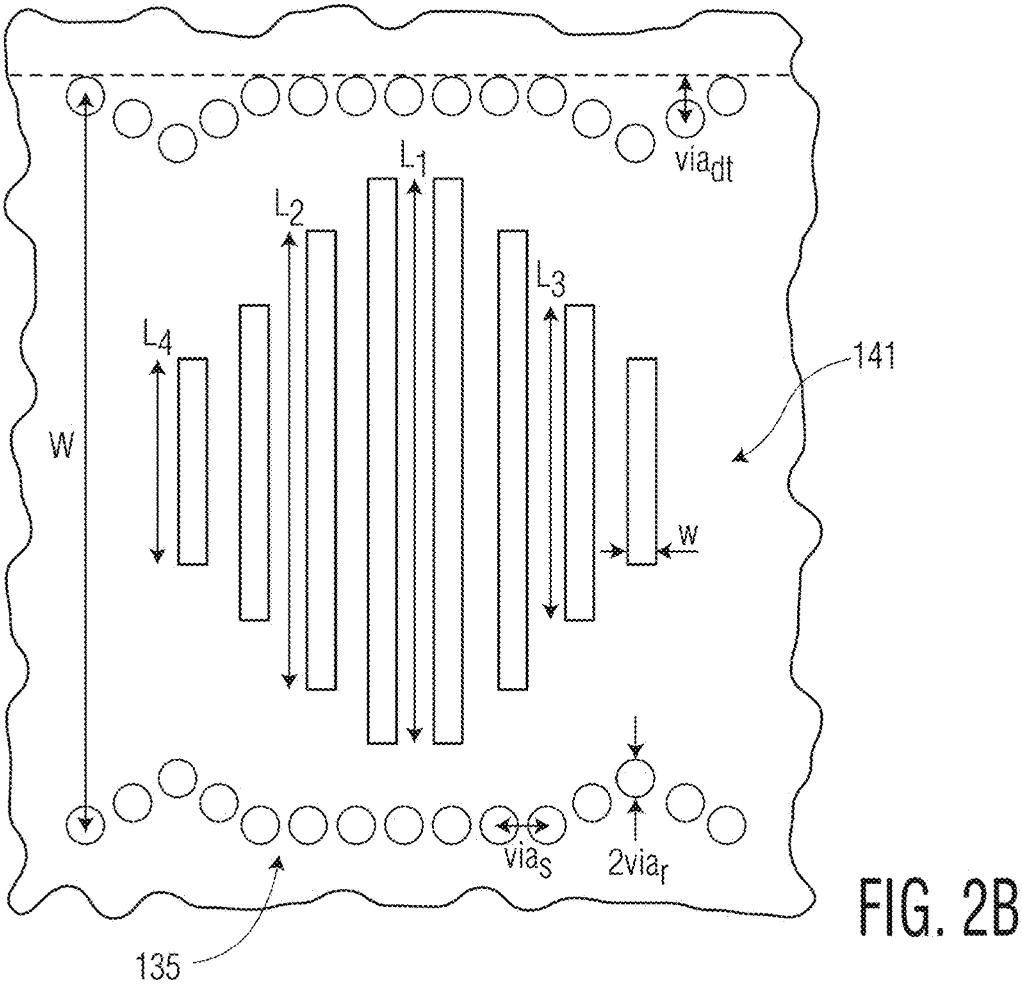
FIG. 2B is an expanded plan view showing elements of the leaky wave antenna of FIG. 1A, FIG. 1B, and FIG. 2A in greater detail.

FIG. 2B is another plan view of the upper surface 132 that illustrates design choices for the group of slotted openings 140 in each group 141. The length (L) of each of the slotted openings 140 can be varied along the with the with the width (w) the openings. In this example, each group 141 of slotted openings 140 includes six slotted openings. The two central slotted openings have the greatest length ($L_1$), while the slotted openings to other side of the first two have a length $L_2$. The next two openings have a width $L_3$, and the final two openings have a width $L_4$. Meanwhile the "baseline" width of the waveguide 120 outside of any of the corrugated portions is W. The maximum displacement 295 (denoted by "$via_{dt}$"). The center-to-center spacing of the electrically-conductive vias 135 is denoted by "$via_s$" and the radius of each via is denoted by "$via_r$". In the example of FIG. 2B, the electrically-conductive vias 135 with the greatest displacements coincide with the position of the shortest slotted openings 140 in each group 141. The length distribution and width of slotted openings such as the slotted openings 140 can be varied to achieve a desired radiation pattern, including tuning the overall directivity and side lobe power. The number of slotted openings in a group (e.g., in a unit cell) can also be varied.

Figure 3:
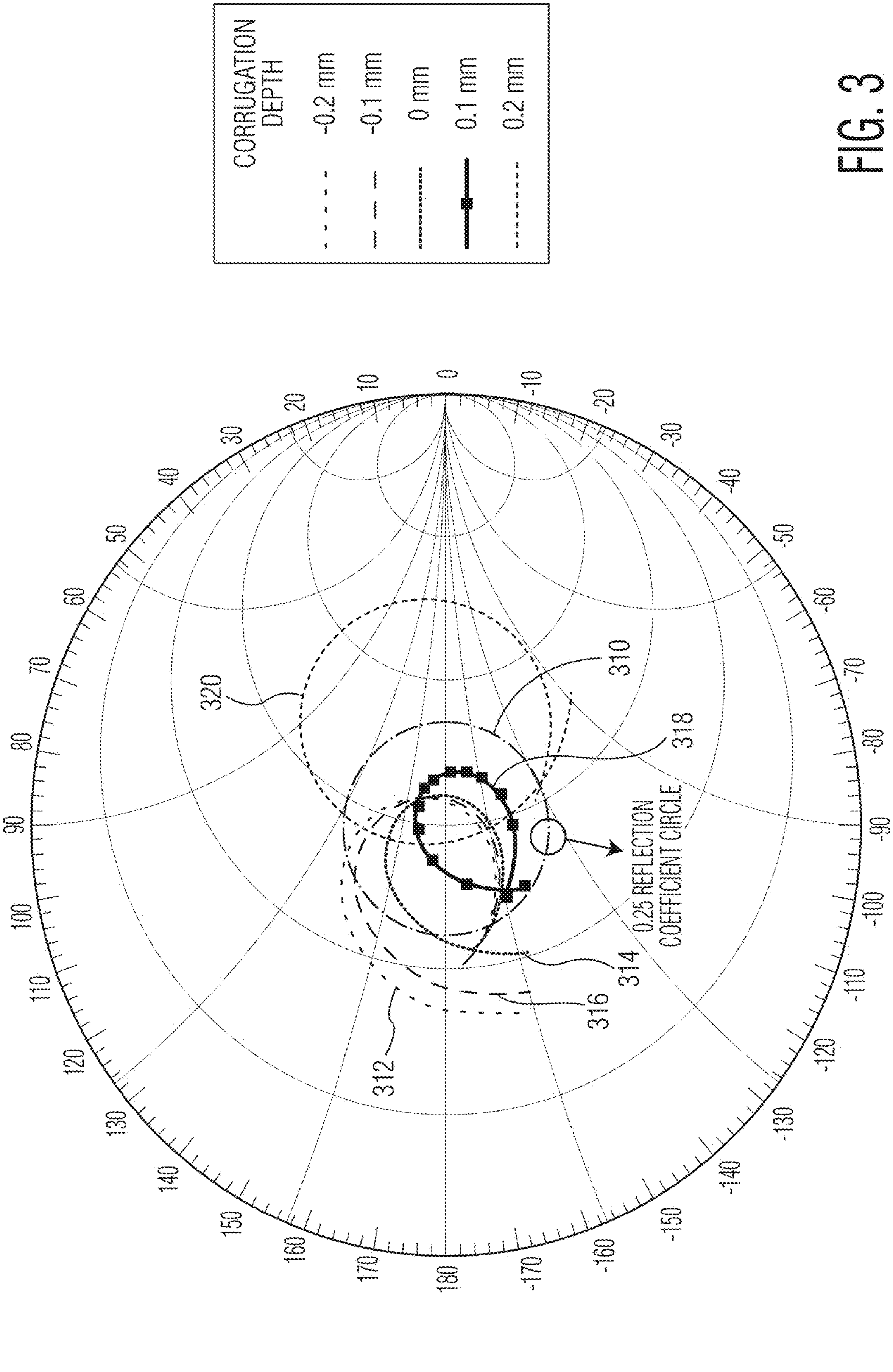
FIG. 3 is a Smith chart illustrating performance characteristics of a leaky wave antenna related to the antenna of FIGS. 1A, 1B, 2A, and 2B obtained by varying the geometry of the waveguide sidewalls.

FIG. 3 is a Smith chart illustrating the effect of changing the amount of corrugation in a waveguide antenna such as the 120 for a fixed slot geometry (e.g., the arrangement of 140 shown in FIG. 2A and FIG. 2B) over an operating bandwidth of 18.7% relative to a center frequency in the millimeter-wave regime. The "corrugation depth" refers to the magnitude and direction in which the sidewalls of the antenna (e.g., the electrically-conductive vias 135 of the waveguide 120) are displaced, with negative values representing displacement away the central axis of the waveguide along its propagation direction (e.g., a center line of the waveguide 120 that is parallel to the propagation direction 195) and positive values representing displacement toward the central axis.

In the example of FIG. 3, the curve 302 is a circle that corresponds to a constant reflection coefficient value of 0.25, or approximately 10 dB return loss. The curves 310, 312, 314, 316, and 320 correspond, respectively, to the reflection coefficients for corrugation depths of −0.2 mm, 0.1 mm, no corrugation, +0.1 mm, and +0.2 mm over the same operational bandwidth. As shown, by choosing an appropriate corrugation depth (e.g., the size and direction of the displacement 295 as shown in FIG. 2A), the reflection coefficient can be kept below 0.25 over the desired operational bandwidth (see the curve 318 corresponding to a corrugation depth of +0.1 mm)

Figure 4A:
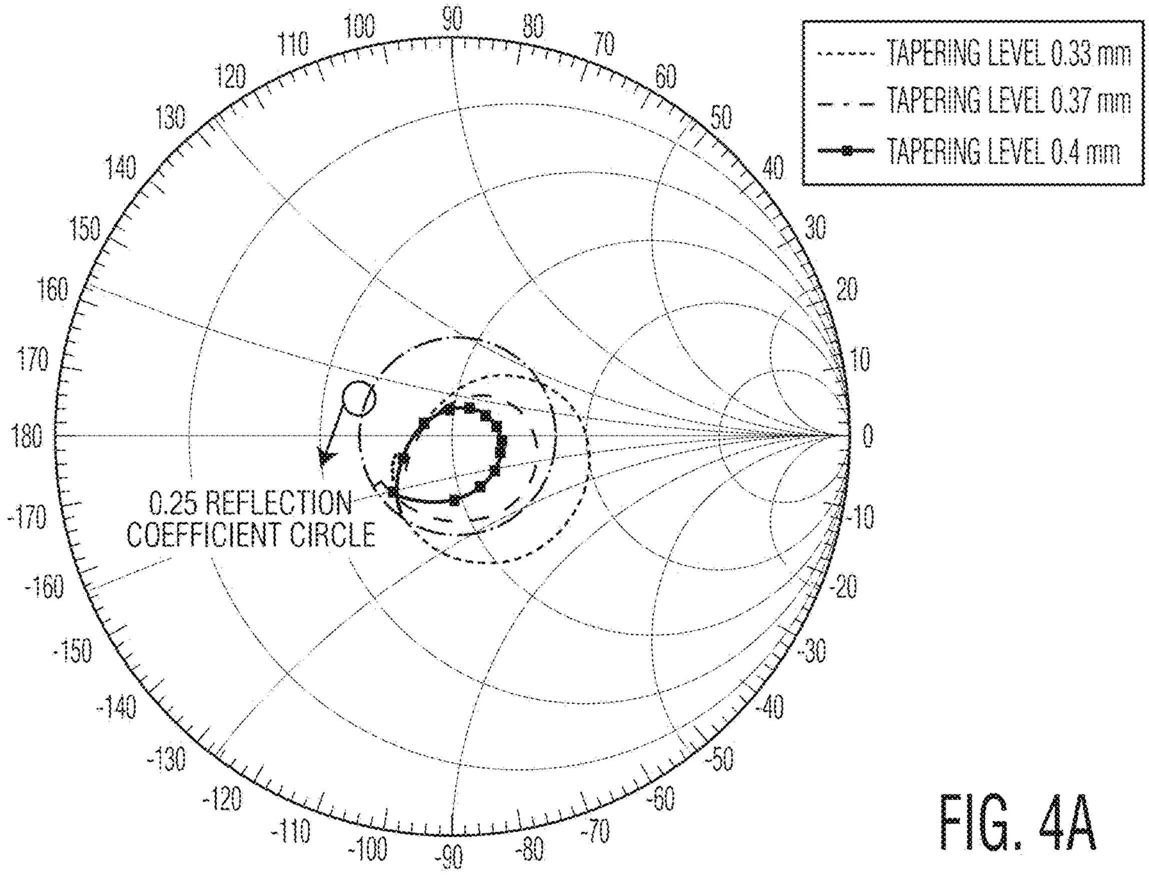
FIG. 4A is a Smith chart illustrating performance characteristics of a leaky wave antenna related to the antenna of FIGS. 1A, 1B, 2A, and 2B obtained by varying the geometry of slotted openings in the waveguide.
Figure 4B:
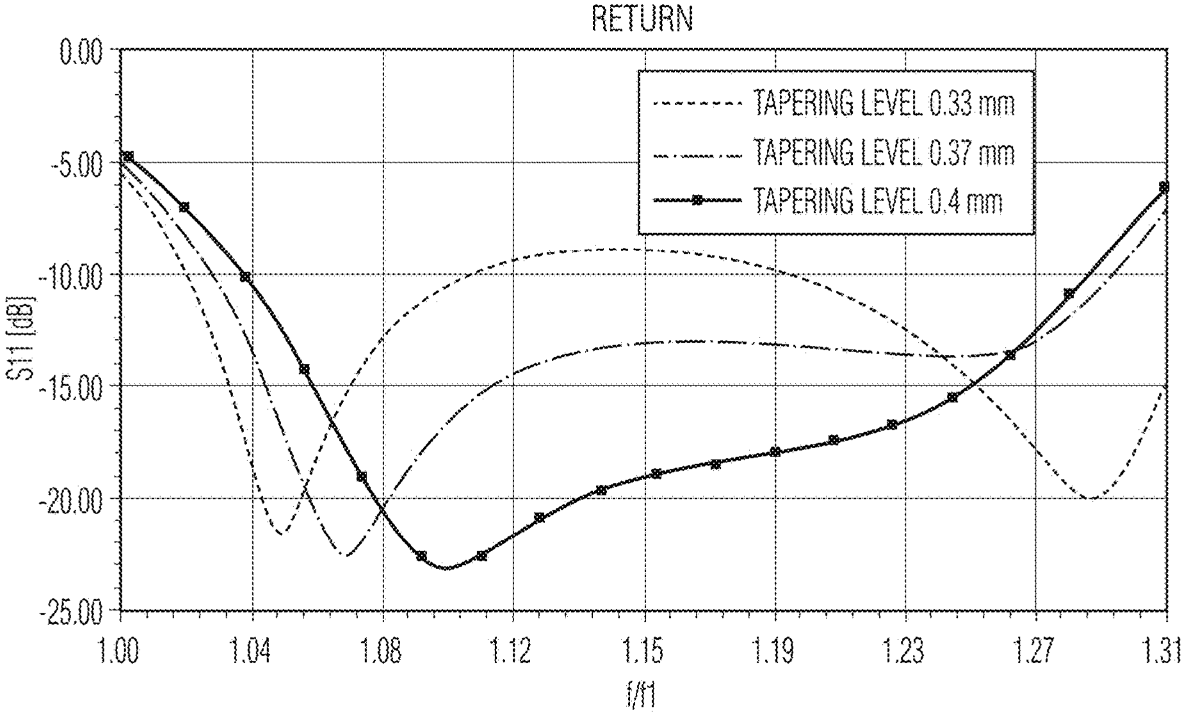
FIG. 4B is a plot further illustrating performance characteristics of the leaky wave antenna represented in FIG. 4A.

FIG. 4A shows the effect of changing the geometry of groups of slotted openings for the same design simulated in FIG. 3 (e.g., the groups 141 of the slotted openings 140). The "tapering level" is defined by the difference in slot length between the innermost slots in each group of slotted openings (e.g., with reference to FIG. 2B, the tapering level would be calculated as $L_1$-$L_4$). As shown, varying the tapering level can significantly impact the observed reflection loss from antennas according to embodiments herein such as the waveguide 120. Along similar lines, FIG. 4B is a plot of the return loss ($S_{11}$) of the antenna design simulated in FIG. 4A over an operational bandwidth equal to approximately 18% of the center frequency for the same tapering levels as shown in FIG. 4A.

Figure 5A:
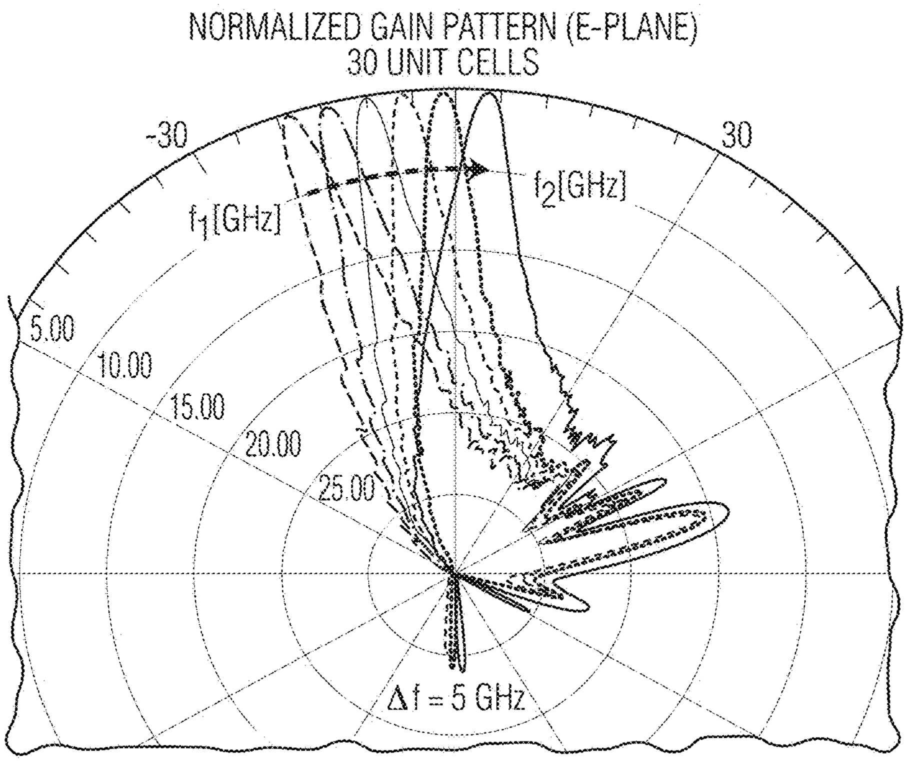
FIG. 5A is a plot of directional radiation patterns for a leaky wave antenna according to one or more embodiments at different operating frequencies.
Figure 5B:
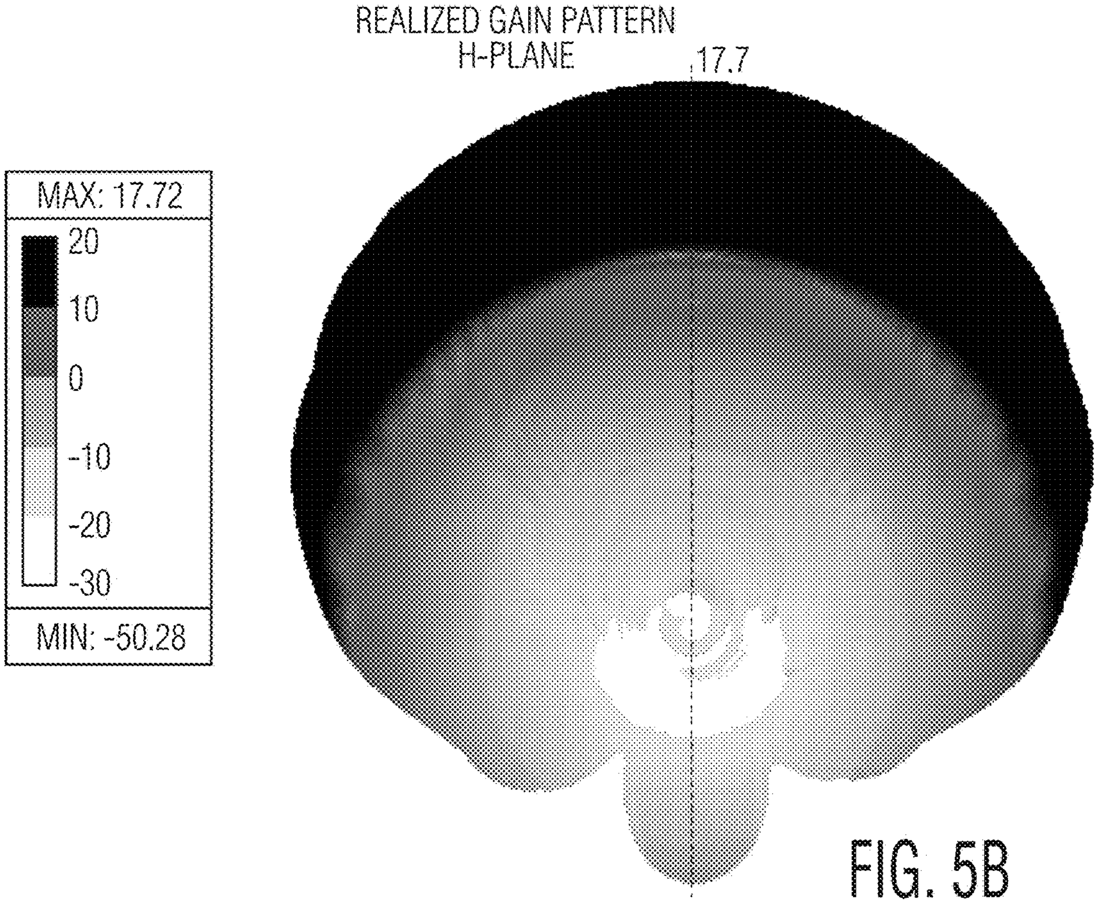
FIG. 5B is another plot of directional radiation patterns for the leaky wave antenna represented by FIG. 5A.

FIG. 5A is a plot illustrating the directivity of the radiation pattern in the E-plane (e.g., the plane that includes the directions propagation direction 195 and the perpendicular direction 199 in FIG. 1A) for an antenna that is designed similarly to the waveguide 120 as described above, at six frequencies spanning a 5 GHz bandwidth. FIG. 5B shows the accompanying H-plane (e.g., the plane that includes the propagation direction 195 and the direction 197 as shown in FIG. 1A) radiation pattern corresponding to the E-plane patterns shown in FIG. 5A. As can be seen form the plots of FIG. 5A and FIG. 5B, a highly directional radiation pattern can be achieved which is steerable by over 25 degrees by varying the center frequency over a 5 GHz bandwidth. As illustrated by FIG. 5A, antennas according to embodiments herein can have beam directions (also referred to as a "maximum power direction" of the radiation pattern) in the E-plane that have a component that points backward, or opposite to the propagation direct of RF energy in the waveguide (e.g., opposite the propagation direction 195 in the waveguide 120) at one or more frequencies within the operational bandwidth of the antenna. However, it will be understood that exhibiting one or more "backward" beam directions is not required for all antennas according to embodiments herein.

The plots of FIG. 5A and FIG. 5B represent simulated performance of an antenna with 30 unit cells (i.e., incorporating 30 groups of slotted openings such as the groups 141 of the slotted openings 140). The antenna represented by the performance characteristics of FIG. 5A and FIG. 5B has slot lengths (see $\{L_1, L_2, L_3, L_4\}$ of FIG. 2B) equal to {1.22 mm, 0.98 mm, 0.66 mm, 0.42 mm}. The baseline width of the waveguide (e.g., Win FIG. 2B) is 1.62 mm. The corrugation depth (e.g., the maximum displacement 295, or $via_{dt}$) is +0.1 mm and the width of each slotted opening (e.g., w in FIG. 2B) is 0.1 mm. The center-to-center distance between vias (see $via_s$ in FIG. 2B) is 0.144 mm and the via radius (see $via_r$ in FIG. 2B) is 0.05 mm. The thickness of the core of the substrate (e.g., the thickness of the dielectric material of the substrate 110 enclosed by the waveguide 120 between the lower surface 131 and the upper surface 132) is 0.254 mm. The total length of each unit cell is 2.16 mm.

It will be understood that the design of leaky wave antennas according to embodiments herein can be varied to achieve desired performance characteristics over desired frequency ranges. The overall radiation pattern of such antennas can be described as the sum of radiation patterns of individual unit cells (e.g., individual groups 141 of slotted openings 140 and accompanying sidewalls of each unit cell formed by structures such as electrically-conductive vias 135). When the unit cells are identical to each other, the total radiation pattern can be expressed as a function of the following variables: the spacing between unit cells (d), the free-space wavenumber (k), the amount of incident power radiated away from each unit cell (α), and the phase progression over each cell (β).

Thus, the overall radiation pattern, $AP_{total}$ can be expressed as $$AP_{total} = (AP_{unit}) * \sum_{n=0}^{N-1} \alpha^n e^{j(kd\sin\theta+\beta)}. \quad \text{[Equation 1]}$$

Equation 1 can be re-arranged as follows:

$$AP_{total} \times e^{j(kd\sin\theta+\beta)} = (AP_{cell}) * \sum_{n=0}^{N-1} \alpha^n e^{j(kd\sin\theta+\beta)n}. \quad \text{[Equation 2]}$$

Subtracting Equation 2 from Equation 1 yields $$AP_{total} \times \left[1 - \alpha e^{j(kd\sin\theta+\beta)}\right] = AP_{cell} \times \left(1 - \alpha^N e^{j(kd\sin\theta+\beta)N}\right). \quad \text{[Equation 3]}$$

Equation 3 can be further simplified as $$AP_{total} = AP_{cell} \times \frac{1 - \alpha^N e^{j(kd\sin\theta+\beta)N}}{1 - \alpha e^{j(kd\sin\theta+\beta)}}. \quad \text{[Equation 4]}$$

Referring to Equation 4, it will be appreciated that, for sufficiently large values of N (the number of unit cells; e.g., the number of groups 141 of slotted openings 140), $$AP_{total} \approx \frac{AP_{cell}}{1 - \alpha e^{j(kd\sin\theta+\beta)}}. \quad \text{[Equation 5]}$$

For a given attenuation factor (α), increasing the number of unit cells will result in higher beam directivity (beam width) and less pronounced side lobes. For a fixed number of unit cells (N), increasing the attenuation factor (α) for will result in less pronounced side lobes at the cost of lower directivity (wider beam width) leads to lower side level but lower directivity (beam width). It will be understood that the performance characteristics of antennas according to embodiments herein can be adjusted by using by varying the number of unit cells and the attenuation factor of each unit cell (i.e., the amount of power radiated away from each unit cell compared to the power that is coupled to that unit cell). The attenuation factor is largely determined by the dimensions of the slotted openings. The directivity, including the beamwidth, is affected by the overall width of the waveguide and lengths of the slotted openings.

Figure 6:
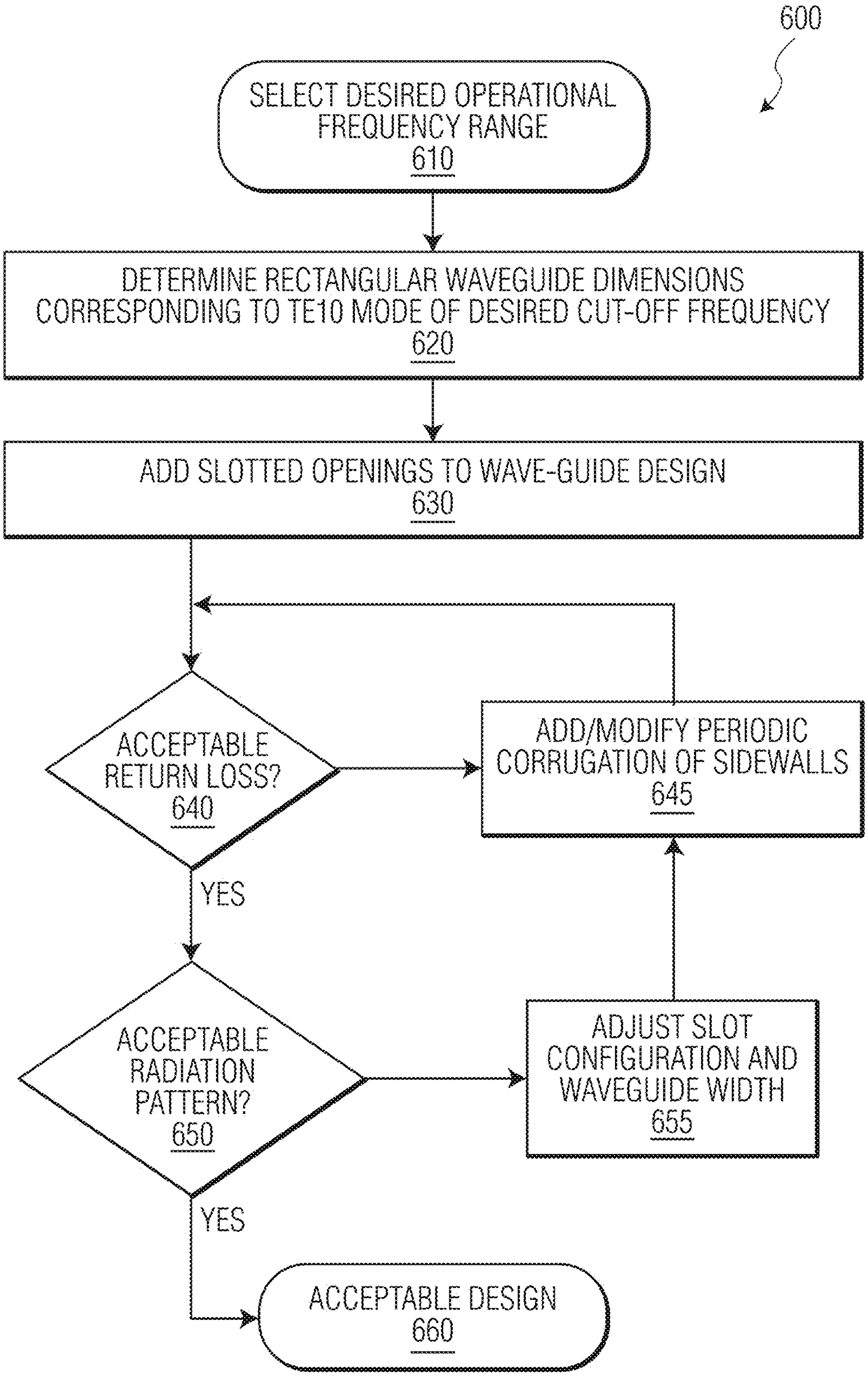
FIG. 6 is a flowchart illustrating an example process for designing a leaky wave antenna according to one or more embodiments.

FIG. 6 is a flowchart illustrating a simplified example process for designing a leaky wave antenna based on a substrate-integrated waveguide such as the waveguide 120. The process 600 includes the steps 610, 620, 640, 645, 650, 655 and 660. At step 610, a desired operational frequency range for the antenna is selected. At step 620 a baseline width (W) is chosen to support a $TE_{10}$ mode for the lowest frequency in the desired range. This width is given by $$W = \frac{c}{2f_c\sqrt{\varepsilon_r}} - \frac{4 * via_r}{0.95 * via_s}$$

where c is the speed of light in a vacuum, $f_c$ is the chosen cut-off frequency, and $\varepsilon_r$ is the relative permittivity of the dielectric material inside the waveguide (e.g., material forming the bulk of the substrate 120). A rectangular waveguide with width W is chosen as a baseline waveguide structure which is iteratively modified as needed to meet desired performance specifications such as a maximum acceptable return loss, minimum acceptable directivity, and a maximum acceptable side lobe power level, as nonlimiting examples.

At step 630, the design is modified to include one or more unit cells with a corresponding group of slotted openings (e.g., a group 141 of slotted openings 140). Next, at step 630, an initial pattern of corrugations in the waveguide sidewalls is selected, resulting in a structure with corrugated sidewalls and slotted openings that is related to the design of the waveguide 120.

At step 640, the process includes determining whether the antenna design has a return loss that is less than a maximum acceptable return loss across the intended operating bandwidth of the antenna. If the return loss is acceptable, the process proceeds to step 650. At step 650, the process includes determining whether the antenna design has an acceptable radiation pattern. This can include determining, as nonlimiting examples, whether the central beamwidth is has a sufficiently narrow angular width, whether the antenna can generate a "backward" beam (one with a directional component that is opposite the direction of energy propagation within the waveguide) at a desired subset frequencies within the desired operating bandwidth, and whether the antenna's radiation pattern exhibits an acceptable amount of power in side lobes of the central beam.

At step 640, if the return loss exceeds the desired maximum return loss at one or more frequencies within the desired operating bandwidth, the process proceeds to step 645, and the corrugation depth is adjusted iteratively until an acceptable return loss is achieved.

At step 650, if the radiation pattern meets the desired performance characteristics, a suitable design is produced at step 660. Otherwise, if the radiation pattern does not yet meet the desired performance characteristics, the process proceeds to step 655.

At step 655, the slot dimensions, the baseline width of the waveguide or both are adjusted as appropriate, and the process returns to step 645. Different modifications to the design may be performed depending on the particular way(s) in which the radiation pattern deviates from the desired performance characteristics. As an example, if the frequency beam-steering range (the angular range of the beam direction in the E-plane over the desired operating bandwidth) is too wide, lengths of the slotted openings of each unit cell (e.g., any one or more of the lengths $L_1$, $L_2$, $L_3$, $L_4$) can be decreased and the baseline width (W) of the waveguide can be increased, followed by variation of the slot configuration to adjust the attenuation factor of each unit cell (e.g., by changing the number of slots, the ratio of the length of each slot to its width, represented by w in FIG. 2B, and so on). Similarly, if the frequency beam-steering range is too narrow, one or more of the slot lengths in each unit cell can be increased and the baseline width of the waveguide can be decreased, followed by variation of the slot configuration to adjust the attenuation factor as needed.

As a further example, if the frequency beam-steering range is acceptable but the overall direction of the beams at each frequency requires adjustment, increasing the slot lengths and increasing the baseline width of the waveguide will rotate the beam directions "forward" (i.e., decreasing the angle between the beam direction and the propagation direction of RF energy within the waveguide in the E-plane). Meanwhile, decreasing the slot lengths and decreasing the baseline width of the waveguide will rotate the beam directions "backward" (i.e., increasing the angle between the beam direction and the propagation direction of RF energy within the waveguide in the E-plane).

It will be appreciated that the process 600 is described above to provide a simplified example of how a leaky wave antenna according to embodiments herein can be designed to have a desired operating bandwidth and to achieve desired performance characteristics such as broadband impedance matching to feeding networks and other components, a desired beam-steering range, desired directivity of the radiation pattern, and so on. It will be appreciated, however, that leaky wave antennas with corrugated sidewalls and slotted openings according to embodiments herein can be designed using any suitable methods. Along these lines, it will be appreciated that, although examples antennas are described as having multiple unit cells nothing herein is intended to require that a leaky wave antenna such as the waveguide 120 or similar antennas according to embodiments herein be formed using identical unit cells.

EXAMPLES

Features of embodiments may be understood by way of one or more of the following examples.

Example 1: a method or device that includes a circuit substrate and a leaky wave antenna formed within the circuit substrate. The antenna includes a hollow or dielectric-filled electrically-conductive waveguide having a length along a first direction that defines a propagation direction for radio-frequency (RF) signals within the waveguide. The waveguide includes a first electrically-conductive surface, a second electrically conductive surface and electrically-conductive vias. The first electrically-conductive surface defines an upper surface of the waveguide. The second electrically-conductive surface is parallel to the upper surface and defines a lower surface of the waveguide. The electrically-conductive vias pass through the circuit substrate between the upper surface and the lower surface of the waveguide that define a first sidewall of the waveguide and a second sidewall of the waveguide that is opposite the first sidewall of the waveguide. The waveguide has slotted openings distributed on the first electrically-conductive surface along the length of the waveguide. The slotted openings are configured to radiate a portion of the RF signals that travel along the propagation direction within the waveguide away from the waveguide. A width of the waveguide varies along the length of the waveguide and is defined by a variable distance between the first and second sidewalls along a second direction that is perpendicular to the first direction.

Example 2: The device or method of Example 1, where the electrically-conductive vias are configured and dimensioned to reflect incident RF signals having frequencies within a predetermined operational frequency range of the antenna such that the incident RF signals are guided along the propagation direction of the waveguide.

Example 3: The device or method of Example 1 or Example 2, where the slotted openings in the first electrically-conductive surface are arranged in groups of slotted openings.

Example 4: The device or method of Example 3, where the width of the waveguide is narrowed at locations that correspond to edges of each group of slotted openings Example 5: The device or method of Example 3 or Example 4, where slots within each group of slotted openings extend toward the first and second sidewalls of the waveguide and have varying lengths along the second direction that is perpendicular to the length of the waveguide.

Example 6: The device or method of any of Examples 1-5, in which groups of slotted openings are disposed periodically along the length of the waveguide according to a first period and the width of the waveguide is narrowed periodically along the first direction according to the first period.

Example 7: The device or method of any of Examples 3-6, where the width of the waveguide is narrowed at locations along the length of the waveguide that correspond to one or more shortest slots in each group of slots.

Example 8: The device or method of any of Examples 1-7, where the antenna exhibits a directional radiation pattern defined by maximum power direction that corresponds to an angle with respect to the upper surface of the waveguide at which an amount of radiated power has a maximum value.

Example 9: The device or method of Example 8 where the maximum power direction of the waveguide antenna depends upon a center frequency of the incident RF signals.

Example 10: The device or method of any of Examples 1-9, where the antenna has a first maximum power direction that corresponds to a first angle with the respect to the upper surface of the waveguide for a first center frequency of the incident RF signals; and the waveguide antenna has a second maximum power direction that corresponds to a first angle with the respect to the upper surface of the waveguide for a second center frequency of the incident RF signals. The second center frequency is larger than the first center frequency by 100 MHz. The first maximum power direction is angularly offset from the second maximum power direction by at least 0.5 degrees.

The preceding detailed description and examples are merely illustrative in nature and are not intended to limit the embodiments of the subject matter or the application and uses of such embodiments. As used herein, the word “exemplary” means “serving as an example, instance, or illustration.” Any implementation described herein as exemplary is not necessarily to be construed as preferred or advantageous over other implementations. Furthermore, there is no intention to be bound by any expressed or implied theory presented in the preceding technical field, background, or detailed description.

It should be understood that this invention is not limited in its application to the details of construction and the arrangement of components set forth in the preceding description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings. Further, “connected” and “coupled” are not restricted to physical or mechanical connections or couplings.

The terms “first,” “second,” “third,” “fourth” and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. It will be appreciated that the steps of various processes described herein are non-limiting examples of suitable processes according to embodiments and are for the purposes of illustration. Embodiments herein may use any suitable processes including those that omit steps of example processes described herein, perform those steps or similar steps in different orders, and the like. It will also be appreciated that well-known techniques and features may be omitted for clarity.

As used herein the terms “substantial” and “substantially” mean sufficient to accomplish the stated purpose in a practical manner and that minor imperfections, if any, are not significant for the stated purpose. Unless explicitly stated otherwise, the terms “approximately” and “substantially”, when used herein to refer to measurable quantities including, but not limited to dimensions, shall mean that a quantity is equal to a stated value or that two quantities are equal to each other to within an amount determined by accepted tolerances of the process(es) chosen to fabricate the relevant structure and/or an accepted measurement accuracy of the method(s) and/or measurement device(s) chosen to measure the dimensions or other properties described.

Furthermore, the terms “comprise,” “include,” “have” and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. The term “coupled,” as used herein, is defined as directly or indirectly connected in an electrical or non-electrical manner.

The foregoing description refers to elements or nodes or features being “connected” or “coupled” together. As used herein, unless expressly stated otherwise, “connected” means that one element is directly joined to (or directly communicates with) another element, and not necessarily mechanically. Likewise, unless expressly stated otherwise, “coupled” means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in one or more embodiments of the depicted subject matter.

The preceding discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The preceding detailed description is to be read with reference to the figures, in which like elements in different figures have like reference numerals. The Figures, which are not necessarily to scale, depict selected embodiments and are not intended to limit the scope of embodiments of the invention. Skilled artisans will recognize the examples provided herein have many useful alternatives and fall within the scope of embodiments of the invention.

The connecting lines shown in the various figures contained herein are intended to represent exemplary functional relationships and/or physical couplings between the various elements. It should be noted that many alternative or additional functional relationships or physical connections may be present in one or more embodiments of the subject matter. In addition, certain terminology may also be used herein for the purpose of reference only, and thus are not intended to be limiting, and the terms “first,” “second” and other such numerical terms referring to structures do not imply a sequence or order unless clearly indicated by the context.

What is claimed is:

1. A device comprising:

a circuit substrate and a waveguide formed within the circuit substrate, the waveguide comprising:

a length along a first direction that defines a propagation direction for radio-frequency (RF) signals within the waveguide;

a first electrically-conductive surface that defines an upper surface of the waveguide with a plurality of groups of slotted openings distributed on the upper surface along the length of the waveguide that are configured to radiate a portion of the RF signals that travel along the propagation direction within the waveguide away from the waveguide, wherein each group of slotted openings comprises at least three slotted openings, and wherein a length of the slotted openings decreases in two directions outwards from a center slotted opening of the group of slotted openings;

a second electrically-conductive surface parallel to the upper surface that defines a lower surface of the waveguide; and electrically-conductive vias that pass through the circuit substrate between the upper surface and the lower surface of the waveguide that define a first sidewall of the waveguide and a second sidewall of the waveguide that is opposite the first sidewall of the waveguide; and wherein a width of the waveguide varies along the length of the waveguide and is defined by a variable distance between the first and second sidewalls along a second direction that is perpendicular to the first direction.

2. The device of claim 1, wherein the electrically-conductive vias are configured and dimensioned to reflect incident RF signals having frequencies within a predetermined operational frequency range of the waveguide such that the incident RF signals are guided along the propagation direction of the waveguide.

3. The device of claim 1, wherein the width of the waveguide is narrowed at locations that correspond to edges of each group of slotted openings.

4. The device of claim 3, wherein the groups of slotted openings are disposed periodically along the length of the waveguide according to a first period and the width of the waveguide is narrowed periodically along the first direction according to the first period.

5. The device of claim 1, wherein the width of the waveguide is narrowed at locations along the length of the waveguide that correspond to one or more shortest slotted opening in each group of slotted openings.

6. The device of claim 1, wherein the waveguide exhibits a directional radiation pattern defined by maximum power direction that corresponds to an angle with respect to the upper surface of the waveguide at which an amount of radiated power has a maximum value; and wherein the maximum power direction of the waveguide depends upon a center frequency of the incident RF signals.

7. The device of claim 6, wherein the waveguide has a first maximum power direction that corresponds to a first angle with respect to the upper surface of the waveguide for a first center frequency of the incident RF signals;

wherein the waveguide has a second maximum power direction that corresponds to a second angle with respect to the upper surface of the waveguide for a second center frequency of the incident RF signals;

wherein the second center frequency is larger than the first center frequency by 100 MHz; and wherein the first maximum power direction is angularly offset from the second maximum power direction by at least 0.5 degrees.

8. A method of forming an antenna, the method comprising:

forming electrically-conductive vias that pass through a circuit substrate between a first electrically-conductive surface of the circuit substrate and a second electrically-conductive surface of the substrate;

wherein the first electrically-conductive surface defines an upper surface of an electrically-conductive hollow or dielectric-filled waveguide;

wherein the second electrically-conductive surface is parallel to the first electrically conductive surface and defines a lower surface of the waveguide;

wherein the electrically-conductive vias define a first sidewall of the waveguide and a second sidewall of the waveguide that is opposite the first sidewall of the waveguide;

wherein the electrically-conductive vias are configured and dimensioned to reflect incident RF signals having frequencies within a predetermined operational frequency range of the antenna such that the incident RF signals coupled to a first end of the waveguide are guided along a propagation direction of the waveguide toward a second end of the waveguide;

wherein a width of the waveguide varies along the length of the waveguide and is defined by a variable distance between the first and second sidewalls along a second direction that is perpendicular to the propagation direction of the waveguide; and wherein the method further comprises:

forming a plurality of groups of slotted openings distributed on the upper surface along the length of the waveguide that are configured to radiate a portion of the RF signals that travel along the propagation direction within the waveguide away from the waveguide;

wherein each group of slotted openings comprises at least three slotted openings, and wherein a length of the slotted openings decreases in two directions outwards from a center of the group and wherein a length of the slotted openings decreases in two directions outwards from a center slotted opening of the group of slotted openings.

9. The method of claim 8, wherein the width of the waveguide is narrowed at locations along the length of the waveguide that correspond to edges of each group of slotted openings.

10. The method of claim 9, wherein the groups of slotted openings are disposed periodically along the length of the waveguide according to a first period and the width of the waveguide is narrowed periodically along the first direction according to the first period.

11. The method of claim 8, wherein the width of the waveguide is narrowed at locations that correspond to one or more shortest slotted opening in each group of slotted openings.

12. The method of claim 8, wherein the waveguide exhibits a directional radiation pattern defined by maximum power direction that corresponds to an angle with respect to the upper surface of the waveguide at which an amount of radiated power has a maximum value; and wherein the maximum power direction of the waveguide depends upon a center frequency of the incident RF signals.

13. The method of claim 12, wherein the waveguide has a first maximum power direction that corresponds to a first angle with respect to the upper surface of the waveguide for a first center frequency of the incident RF signals;

wherein the waveguide has a second maximum power direction that corresponds to a second angle with respect to the upper surface of the waveguide for a second center frequency of the incident RF signals;

wherein the second center frequency is larger than the first center frequency by 100 MHz; and wherein the first maximum power direction is angularly offset from the second maximum power direction by at least 0.5 degrees.

14. A waveguide antenna, comprising:

a first electrically-conductive surface comprising a plurality of groups of slotted openings distributed on the upper surface along a length of the waveguide; wherein each group of slotted openings comprises at least three slotted openings, and wherein a length of the slotted openings decreases in two directions outwards from a center slotted opening of the group of slotted openings;

wherein the length is along a first direction that defines a propagation direction for radio-frequency (RF) signals within the waveguide; and wherein a width of the waveguide is along a second direction that is perpendicular to the first direction.

15. The waveguide antenna of claim 14, wherein the groups of slotted openings are disposed periodically along the length of the waveguide according to a first period and the width of the waveguide is narrowed periodically along the first direction according to the first period.

16. The waveguide antenna of claim 14, further comprising:

a second electrically-conductive surface parallel to the upper surface that defines a lower surface of the waveguide; and electrically-conductive vias that pass through the waveguide between the upper surface and the lower surface of the waveguide that define a first sidewall of the waveguide and a second sidewall of the waveguide that is opposite the first sidewall of the waveguide; and wherein the width of the waveguide varies along the length of the waveguide and is defined by a variable distance between the first and second sidewalls.

17. The waveguide antenna of claim 14, wherein the width of the waveguide is narrowed at locations along the length of the waveguide that correspond to one or more shortest slotted openings in each group of slotted openings.

18. The waveguide antenna of claim 14, wherein the width of the waveguide is narrowed at locations that correspond to edges of each group of slotted openings.

* * * * *